United States Patent
Hwang et al.

(10) Patent No.: US 8,644,006 B2
(45) Date of Patent: Feb. 4, 2014

(54) COMPOSITE CATHODE FOILS AND SOLID ELECTROLYTIC CAPACITORS COMPRISING THE SAME

(75) Inventors: Jenn-Yeu Hwang, Keelung (TW); Jin-Bao Wu, Hsinchu (TW); Li-Duan Tsai, Hsinchu (TW); Ming-Sheng Leu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 491 days.

(21) Appl. No.: 12/344,426

(22) Filed: Dec. 26, 2008

(65) Prior Publication Data

US 2010/0128416 A1    May 27, 2010

(30) Foreign Application Priority Data

Nov. 26, 2008 (TW) ................................ 97145674 A

(51) Int. Cl.
*H01G 9/045* (2006.01)
*H01G 9/04* (2006.01)
*B21C 37/02* (2006.01)

(52) U.S. Cl.
USPC .......................................... 361/532; 361/523

(58) Field of Classification Search
USPC ................... 361/500–541; 428/607; 29/25.03
See application file for complete search history.

(56) References Cited

U.S. PATENT DOCUMENTS

| | | | | |
|---|---|---|---|---|
| 3,242,402 A | * | 3/1966 | Stahr et al. | 361/318 |
| 3,327,184 A | * | 6/1967 | Valley | 361/309 |
| 3,333,169 A | * | 7/1967 | Valley | 361/313 |
| 3,540,926 A | * | 11/1970 | Rairden | 427/567 |
| 5,576,928 A | * | 11/1996 | Summerfelt et al. | 361/321.1 |
| 6,519,137 B1 | * | 2/2003 | Nitta et al. | 361/525 |
| 7,006,348 B1 | * | 2/2006 | Ueda et al. | 361/530 |
| 7,327,556 B2 | | 2/2008 | Ro et al. | |
| 2004/0240155 A1 | * | 12/2004 | Miltich et al. | 361/512 |
| 2006/0171102 A1 | | 8/2006 | Ro et al. | |
| 2008/0130202 A1 | * | 6/2008 | Ro et al. | 361/516 |
| 2008/0229565 A1 | * | 9/2008 | Schott et al. | 29/25.03 |
| 2010/0097743 A1 | * | 4/2010 | Yoshida et al. | 361/504 |

FOREIGN PATENT DOCUMENTS

| | | |
|---|---|---|
| CN | 1289861 A | 4/2001 |
| CN | 1321322 A | 11/2001 |
| CN | 1714416 | 12/2005 |
| JP | 2000-114108 | 4/2000 |
| JP | 2007-042732 | 2/2007 |
| TW | 468189 | 12/2001 |
| TW | I223294 | 11/2004 |

\* cited by examiner

*Primary Examiner* — Anatoly Vortman

(57) ABSTRACT

A composite cathode foil is provided. The composite cathode foil includes an aluminum substrate, a metal layer formed thereon, a metal carbide layer formed on the metal layer, and a carbon layer formed on the metal carbide layer, wherein the metal of the metal layer is selected from the group consisting of IVB, VB and VIB groups. The invention also provides a solid electrolytic capacitor including the composite cathode foil.

17 Claims, 3 Drawing Sheets

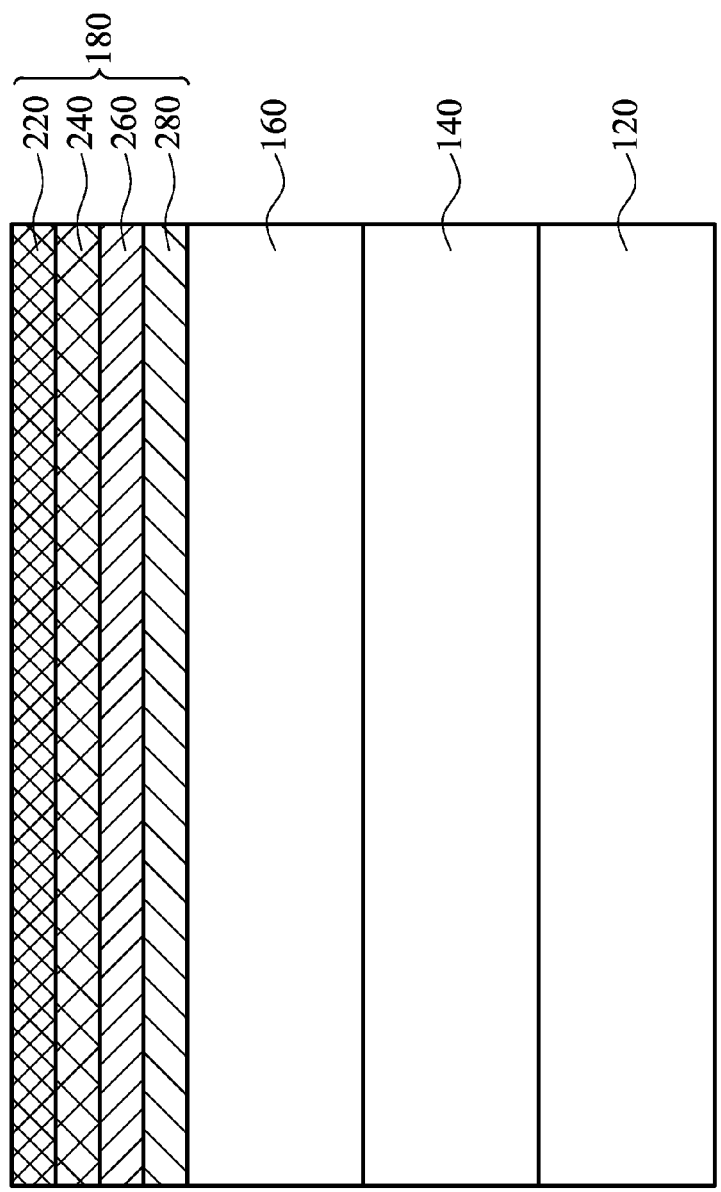

COMPOSITE CATHODE FOILS AND SOLID ELECTROLYTIC CAPACITORS COMPRISING THE SAME

CROSS REFERENCE TO RELATED APPLICATIONS

This Application claims priority of Taiwan Patent Application No. 97145674, filed on Nov. 26, 2008, the entirety of which is incorporated by reference herein.

BACKGROUND OF THE INVENTION

1. Field of the Invention

The invention relates to an electrode foil, and more particularly to a composite cathode foil and a solid electrolytic capacitor comprising the same.

2. Description of the Related Art

For solid electrolytic capacitors, a solid electrolyte (cathode) comprises semiconductor oxides such as $MnO_2$, organic semiconductors such as TCNQ or conductive polymers such as polyaniline, polypyrrole, polythiophene or derivatives thereof. Among conductive polymers, poly(3,4-ethylenedioxythiophene (PEDOT) with high conductivity and stability is popular. A conductive polymer solid electrolyte layer was prepared by immersing an element in a solution containing monomers and an oxidizer to generate chemical polymerization or immersing an element in a solution containing monomers and electrolyte to generate electrochemical polymerization. The conductive polymer layer is coated on a dielectric oxide layer over an anode to act as a cathode. Further, charges are led out through a current collector. To achieve complete capacitance exhibition, in addition to filling conductive polymer electrolyte in pores of a porous electrode, the conductive polymer and the current collector should be closely knitted to one another.

A conductive material, for example, metals, conductive metal compounds (metal oxides, metal nitrides and metal carbides), carbon or composite materials thereof is suitable for use as a current collector. In a chip type solid electrolytic capacitor, a conductive polymer electrolyte is coated by a carbon layer and a conductive silver layer and connected with a metal lead. In a wound type solid electrolytic capacitor, a conductive polymer electrolyte is connected with an electrode foil (a current collector, an external cathode end) such as an aluminum foil.

To ensure that the solid electrolytic capacitor is a low-resistance device, conductive layers with high conductivity, compatibility and adhesiveness with one another over an anode dielectric layer are required. Additionally, to increase capacitance, the electrode and electrolyte should be closely knitted to one another. In a wound type solid electrolytic capacitor, opposite to a plain aluminum foil, a porous cathode aluminum foil (current collector) with an enlarged surface area formed by etching is proper, due to requirement for a sufficient contact area between the cathode foil (current collector) and electrolyte (cathode) to enlarge capacitance. An electrolyte, however, does not easily fill in the internal pores of the etched aluminum cathode foil with high capacitance, contrarily reducing capacitance.

JP 2000-114108 discloses using an etched aluminum foil plated with a titanium nitride conductive layer as a cathode foil (current collector) to increase capacitance. However, after a long thermal treatment with temperatures of 100-300° C., the etched aluminum foil plated with the titanium nitride conductive layer is easily oxidized to form an oxide film of titanium oxide and aluminum oxide therebetween. Compared to a conductive polymer solid electrolyte with resistance of $10^{-2}$-$10^3$ Ωcm, the oxide film has a considerably large resistance, exceeding $10^6$ Ωcm, causing increased equivalent serial resistance (ESR). The same aforementioned result also occurs for use of metals or metal compounds as a current collector.

Using carbon as the material of current collector can avoid oxidation. JP 2007-042732 discloses using a surface enlarged roughened aluminum foil coated with carbon particles as a cathode foil (current collector) to increase capacitance and reduce ESR. Carbon, however, has low adhesion to aluminum foil, causing current collector peeling and increased ESR. U.S. Pat. No. 7,327,556 discloses using an aluminum substrate coated with a carbon layer to enlarge the surface area thereof. An aluminum carbide interposition layer is further formed between the aluminum substrate and the carbon layer to increase adhesion therebetween. However, a long thermal treatment with temperatures of 440-660° C. for over 10 hours under methane and acetylene is required. In addition, special equipment to ensure safety of the high-temperature process conducted with flammable gases is also required. Thus, production efficiency is hindered.

BRIEF SUMMARY OF THE INVENTION

One embodiment of the invention provides a composite cathode foil comprising an aluminum substrate, a metal layer formed thereon, a metal carbide layer formed on the metal layer, and a carbon layer formed on the metal carbide layer, wherein the metal of the metal layer is selected from the group consisting of IVB, VB and VIB groups.

One embodiment of the invention provides a solid electrolytic capacitor comprising an anode, a dielectric layer formed thereon, a cathode formed on the dielectric layer, and a composite cathode foil formed on the cathode, the composite cathode foil comprising an aluminum substrate, a metal layer formed thereon, a metal carbide layer formed on the metal layer, and a carbon layer formed on the metal carbide layer, wherein the metal of the metal layer is selected from the group consisting of IVB, VB and VIB groups.

A multilayered composite structure is conducted between an aluminum substrate and a carbon layer of a cathode foil. A metal layer is formed on the aluminum substrate. A metal carbide layer is then formed on the metal layer. A carbon layer is formed on the metal carbide layer. The metal layer and the metal carbide layer are used to connect the aluminum substrate and the carbon layer. The carbon layer prevents the underneath aluminum substrate, metal layer and metal carbide layer from oxidization, with superior high-temperature resistance and anti-oxidization when compared to a conventional titanium nitride layer. Additionally, the metal carbide layer has a high adhesion to substrate due to selection of the IVB, VB or VIB group metal carbides with high wear-resistance and adhesion. The foregoing conductive material layers have low resistance and have high compatibility and adhesivity one another. Accordingly, using a plain aluminum foil substrate without an etching and roughening treatment can easily achieve improved device capacitance and reduced resistance.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein:

FIG. 3 is a structure of a solid electrolytic capacitor according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides a composite cathode foil comprising an aluminum substrate, a metal layer formed thereon, a metal carbide layer formed on the metal layer, and a carbon layer formed on the metal carbide layer.

The aluminum substrate may be a plain aluminum foil without an etching and roughening treatment. The metal of the metal layer may be selected from the group consisting of IVB, VB and VIB groups, for example, titanium, zirconium or hafnium (IVB group), vanadium, niobium or tantalum (VB group), and chromium, molybdenum or tungsten (VIB group). The metal carbide layer may comprise carbides corresponding to the metal layer, for example, titanium carbide, zirconium carbide, hafnium carbide, vanadium carbide, niobium carbide, tantalum carbide, chromium carbide, molybdenum carbide or tungsten carbide. The metal layer and the metal carbide layer respectively have thicknesses of about 10-100 nm. The carbon layer has a thickness of about 100-1,000 nm. The composite cathode foil has resistivity of about $10^{-3}$-$10^3$ $\Omega$cm.

Figure 1:
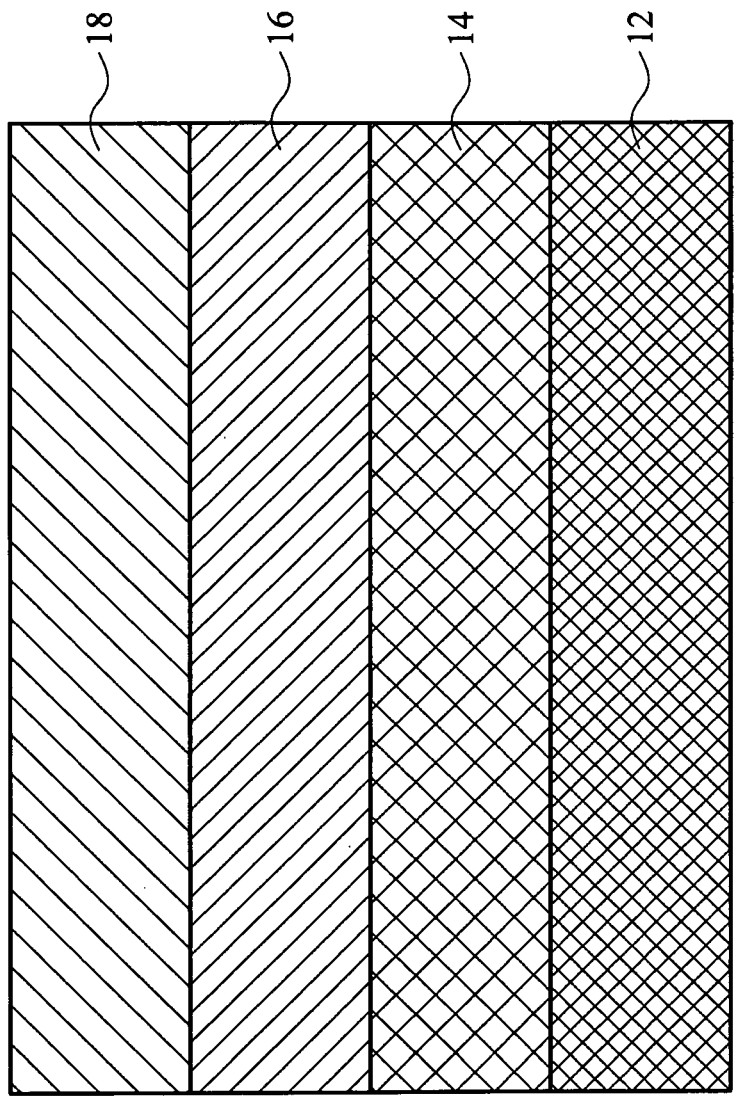
FIG. 1 is a structure of a composite cathode foil according to an embodiment of the invention.

A composite cathode foil is disclosed in FIG. 1, according to an embodiment of the invention. The composite cathode foil 10 comprises an aluminum substrate 12, a metal layer 14, a metal carbide layer 16 and a carbon layer 18. The metal layer 14 is formed on the aluminum substrate 12. The metal carbide layer 16 is formed on the metal layer 14. The carbon layer 18 is formed on the metal carbide layer 16.

Referring to FIG. 3, one embodiment of the invention provides a solid electrolytic capacitor 100 comprising an anode 120, a dielectric layer 140 formed thereon, a cathode 160 formed on the dielectric layer 140, and a composite cathode foil 180 formed on the cathode 160. The composite cathode foil 180 comprises an aluminum substrate 220, a metal layer 240 formed thereon, a metal carbide layer 260 formed on the metal layer 240, and a carbon layer 280 formed on the metal carbide layer 260. A separator (not shown) is further placed between the anode foil with the dielectric layer formed thereon and the cathode foil.

The anode may be an etched aluminum foil. The cathode may comprise a solid electrolyte, for example, conductive polymers. The dielectric layer may be an aluminum oxide layer. In the composite cathode foil, the aluminum substrate may be a plain aluminum foil without an etching and roughening treatment. The metal of the metal layer may be selected from the group consisting of IVB, VB and VIB groups, for example, titanium, zirconium or hafnium (IVB group), vanadium, niobium or tantalum (VB group), and chromium, molybdenum or tungsten (VIB group). The metal carbide layer may comprise carbides corresponding to the metal layer, for example, titanium carbide, zirconium carbide, hafnium carbide, vanadium carbide, niobium carbide, tantalum carbide, chromium carbide, molybdenum carbide or tungsten carbide. The metal layer and the metal carbide layer respectively have thicknesses of about 10-100 nm. The carbon layer has thickness of about 100-1,000 nm. The composite cathode foil has lower resistivity than that of the solid electrolyte composed of the conductive polymers, facilitating internal resistance reduction of the solid electrolytic capacitor. The composite cathode foil has resistivity of about $10^{-3}$-$10^3$ $\Omega$cm. The solid electrolytic capacitor may be a wound type solid electrolytic capacitor.

A multilayered composite structure is conducted between an aluminum substrate and a carbon layer of a cathode foil. A metal layer is formed on the aluminum substrate. A metal carbide layer is then formed on the metal layer. A carbon layer is formed on the metal carbide layer. The metal layer and the metal carbide layer are used to connect the aluminum substrate and the carbon layer. The carbon layer prevents the underneath aluminum substrate, metal layer and metal carbide layer from oxidization, with superior high-temperature resistance and anti-oxidization when compared to a conventional titanium nitride layer. Additionally, the metal carbide layer has high adhesion to substrate due to selection of the IVB, VB or VIB group metal carbides with high wear-resistance and adhesion. The foregoing conductive material layers have low resistance and have high compatibility and adhesivity one another. Accordingly, using a plain aluminum foil substrate without an etching and roughening treatment can easily achieve improved device capacitance and reduced resistance.

The composite cathode foil was prepared by, for example, a physical film deposition process such as vacuum evaporation, ion plating and sputtering evaporation or a chemical film deposition process such as chemical vapor deposition. In an embodiment, the composite cathode foil was prepared by arc ion plating with rapid film formation, a simple operation, and unification and is suitable to be applied in industrial production, but is not limited thereto. Other physical film deposition or chemical film deposition processes may also be suitable for use therein. In an embodiment, conductive materials are formed on an aluminum foil using cathode arc plasma with high energy plasma. A thin film with low resistance, high adhesion and chemical stability can thus prepared by adjusting various gases, pressure and applied bias under a temperature of less than 200° C., and even as low as 20-100° C.

Example 1

Preparation of a Composite Electrode:

A composite electrode was prepared by a cathode arc plasma. The substrate was a plain aluminum foil. The target was titanium and graphite. For the processes, inert gas and hydrocarbon-containing gas were conducted. The temperature was 20-100° C. The pressure was $10^{-4}$-2 Pa. The bias was −500-0V. A titanium layer was formed on the plain aluminum substrate. A titanium carbide layer was then formed on the titanium layer. Next, a carbon layer was formed on the titanium carbide layer. An aluminum/titanium/titanium carbide/carbon composite electrode was prepared. The carbon layer had a thickness of 288 nm. The titanium layer and the titanium carbide layer respectively had thicknesses of about 10-100 nm.

Preparation of a Solid Electrolytic Capacitor:

The aluminum/titanium/titanium carbide/carbon composite cathode foil, an etched anode aluminum foil with a dielectric layer formed thereon and a separator were wound to form a capacitor element. After formation and a 100-300° C. thermal treatment, the capacitor element was immersed in a solution containing 3,4-ethylenedioxythiophene (EDOT) monomer and iron(III) p-toluenesulfonate (oxidizer). After removing from the solution, the monomer in the elements were polymerized under a temperature of 25-300° C. for 30-600 minutes to form a poly(3,4-ethylenedioxythiophene) (PEDOT) solid electrolyte. After film formation of the electrolyte, the capacitor was packaged. The capacitance thereof is shown in Table 1. The equivalent serial resistance (ESR) thereof at 120 Hz and 100 kHz is shown in Table 2.

Example 2

Preparation of a Composite Electrode:
The preparation was similar to Example 1. The difference therebetween was that the titanium target of Example 1 was replaced by zirconium. An aluminum/zirconium/zirconium carbide/carbon composite electrode was prepared. The carbon layer had a thickness of 430 nm. The zirconium layer and the zirconium carbide layer respectively had thicknesses of about 10-100 nm.

Preparation of a Solid Electrolytic Capacitor:
The preparation was similar to Example 1. The difference therebetween was that the cathode foil of Example 1 was replaced by the aluminum/zirconium/zirconium carbide/carbon composite electrode. The capacitance thereof is shown in Table 1. The equivalent serial resistance (ESR) thereof at 120 Hz and 100 kHz is shown in Table 2.

Example 3

Preparation of a Composite Electrode:
The preparation was similar to Example 1. The difference therebetween was that the titanium target of Example 1 was replaced by chromium. An aluminum/chromium/chromium carbide/carbon composite electrode was prepared. The carbon layer had a thickness of 430 nm. The chromium layer and the chromium carbide layer respectively had thicknesses of about 10-100 nm.

Preparation of a Solid Electrolytic Capacitor:
The preparation was similar to Example 1. The difference therebetween was that the cathode foil of Example 1 was replaced by the aluminum/chromium/chromium carbide/carbon composite electrode. The capacitance thereof is shown in Table 1.

Example 4

Preparation of a Composite Electrode:
The preparation was similar to Example 1. The difference therebetween was that the titanium target of Example 1 was replaced by tungsten. An aluminum/tungsten/tungsten carbide/carbon composite electrode was prepared. The carbon layer had a thickness of 230 nm. The tungsten layer and the tungsten carbide layer respectively had thicknesses of about 10-100 nm.

Preparation of a Solid Electrolytic Capacitor:
The preparation was similar to Example 1. The difference therebetween was that the cathode foil of Example 1 was replaced by the aluminum/tungsten/tungsten carbide/carbon composite electrode. The capacitance thereof is shown in Table 1.

Comparative Example 1

Preparation of a Solid Electrolytic Capacitor:
The preparation was similar to Example 1. The difference therebetween was that the cathode foil of Example 1 was replaced by an etched aluminum foil. The capacitance thereof is shown in Table 1. The equivalent serial resistance (ESR) thereof at 120 Hz and 100 kHz is shown in Table 2.

Comparative Example 2

Preparation of a Solid Electrolytic Capacitor:
The preparation was similar to Example 1. The difference therebetween was that the cathode foil of Example 1 was replaced by a plain aluminum foil. The capacitance thereof is shown in Table 1. The equivalent serial resistance (ESR) thereof at 120 Hz and 100 kHz is shown in Table 2.

Comparative Example 3

Preparation of a Solid Electrolytic Capacitor:
The preparation was similar to Example 1. The difference therebetween was that the cathode foil of Example 1 was replaced by an aluminum foil deposited with titanium nitride. The capacitance thereof is shown in Table 1. The equivalent serial resistance (ESR) thereof at 120 Hz and 100 kHz is shown in Table 2.

Comparative Example 4

Preparation of a Solid Electrolytic Capacitor:
The preparation was similar to Example 1. The difference therebetween was that the cathode foil of Example 1 was replaced by an aluminum foil coated with carbon. The capacitance thereof is shown in Table 1. The equivalent serial resistance (ESR) thereof at 120 Hz and 100 kHz is shown in Table 2.

TABLE 1

| Examples | Cathode foil | Capacitance (μF) |
|---|---|---|
| Example 1 | Aluminum/titanium/titanium carbide/carbon | 863.0 |
| Example 2 | Aluminum/zirconium/zirconium carbide/carbon | 938.0 |
| Example 3 | Aluminum/chromium/chromium carbide/carbon | 943.0 |
| Example 4 | Aluminum/tungsten/tungsten carbide/carbon | 939.0 |
| Comparative Example 1 | Etched aluminum foil | 480.3 |
| Comparative Example 2 | Plain aluminum foil | 789.0 |
| Comparative Example 3 | Aluminum/titanium nitride | 858.8 |
| Comparative Example 4 | Aluminum/carbon | 942.0 |

Compared to conventional solid electrolytic capacitors (Comparative Examples 1-4), the solid electrolytic capacitors of the invention (Examples 1-4) had higher capacitances. That is, the composite cathode foil of the invention had superior impregnation ability to solid electrolytes than other cathode foils.

TABLE 2

| Examples | Cathode foil | 120 Hz ESR (mΩ) | 100 kHz ESR (mΩ) |
|---|---|---|---|
| Example 1 | Aluminum/titanium/titanium carbide/carbon | 23.0 | 5.00 |
| Example 2 | Aluminum/zirconium/zirconium carbide/carbon | 22.6 | 5.90 |
| Comparative Example 1 | Etched aluminum foil | 139.6 | 5.76 |
| Comparative Example 2 | Plain aluminum foil | 13379 | 450 |

TABLE 2-continued

| Examples | Cathode foil | 120 Hz ESR (mΩ) | 100 kHz ESR (mΩ) |
|---|---|---|---|
| Comparative Example 3 | Aluminum/titanium nitride | 25.6 | 7.43 |
| Comparative Example 4 | Aluminum/carbon | 1040.6 | 489 |

Compared to conventional solid electrolytic capacitors (Comparative Examples 1-4), the solid electrolytic capacitors of the invention (Examples 1-2) had lower ESR at 120 Hz. That is, the composite cathode foil of the invention had higher adhesivity to solid electrolytes than that of other cathode foils. Also, compared to conventional solid electrolytic capacitors (Comparative Examples 1-4), the solid electrolytic capacitors of the invention (Examples 1-2) had lower ESR at 100 kHz. That is, the composite cathode foil of the invention had lower resistivity than other cathode foils.

Example 5

Figure 2:
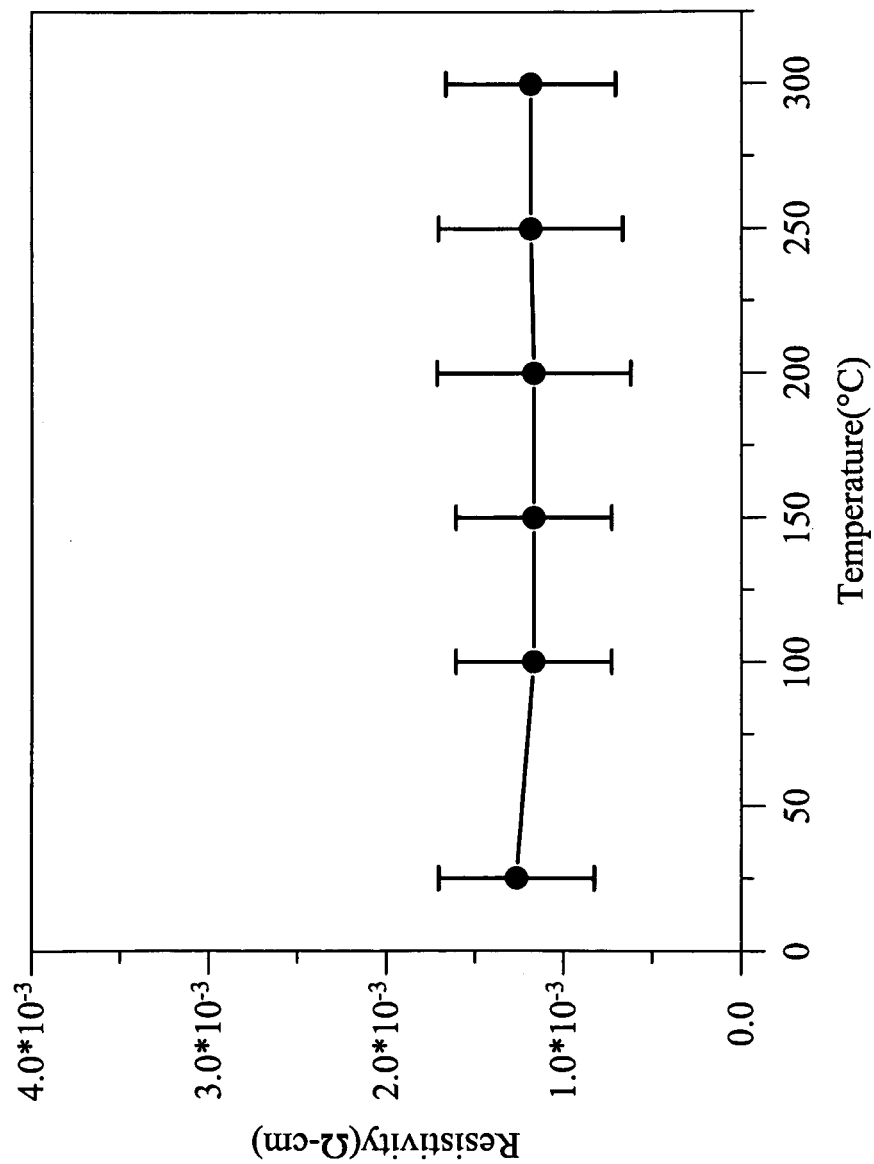
FIG. 2 shows a relationship between temperature and resistivity of a composite cathode foil of the invention.

The aluminum/titanium/titanium carbide/carbon composite cathode foil prepared by Example 1 was heated under various temperatures. The variation of resistivity is shown in FIG. 2. The composite cathode foil maintained resistivity of about $1.2*10^{-3}$ Ωcm under various temperatures between 25-300° C. That is, the composite cathode foil of the invention had high chemical stability even after a thermal treatment.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A composite cathode of a solid electrolytic capacitor, comprising:
    a cathode foil, comprising:
        a plain aluminum foil without an etching and roughening treatment;
        a metal layer formed on the plain aluminum foil, wherein the metal of the metal layer is selected from the group consisting of IVB, VB and VIB groups;
        a metal carbide layer formed on the metal layer, wherein the metal carbide layer comprises a carbide of the metal of the metal layer; and
        a carbon layer formed on the metal carbide layer.

2. The composite cathode of a solid electrolytic capacitor as claimed in claim 1, wherein the metal layer comprises titanium, zirconium, hafnium, vanadium, niobium, tantalum, chromium, molybdenum or tungsten.

3. The composite cathode of a solid electrolytic capacitor as claimed in claim 1, wherein the metal carbide layer comprises titanium carbide, zirconium carbide, hafnium carbide, vanadium carbide, niobium carbide, tantalum carbide, chromium carbide, molybdenum carbide or tungsten carbide.

4. The composite cathode of a solid electrolytic capacitor as claimed in claim 1, wherein the metal layer and the metal carbide layer respectively have thicknesses of 10-100 nm.

5. The composite cathode of a solid electrolytic capacitor as claimed in claim 1, wherein the carbon layer has a thickness of 100-1,000 nm.

6. The composite cathode of a solid electrolytic capacitor as claimed in claim 1, wherein the composite cathode has resistivity of $10^{-3}$-$10^3$ Ωcm.

7. A solid electrolytic capacitor, comprising:
    an anode;
    a dielectric layer formed thereon;
    a cathode formed on the dielectric layer; and
    a composite cathode foil formed on the cathode, comprising a plain cathode aluminum foil without an etching and roughening treatment, a metal layer formed thereon, a metal carbide layer formed on the metal layer and a carbon layer formed on the metal carbide layer, wherein the metal of the metal layer is selected from the group consisting of IVB, VB and VIB groups.

8. The solid electrolytic capacitor as claimed in claim 7, wherein the anode is an etched aluminum foil.

9. The solid electrolytic capacitor as claimed in claim 7, wherein the cathode comprises solid electrolyte.

10. The solid electrolytic capacitor as claimed in claim 9, wherein the solid electrolyte comprises conductive polymers.

11. The solid electrolytic capacitor as claimed in claim 7, wherein the dielectric layer is an aluminum oxide layer.

12. The solid electrolytic capacitor as claimed in claim 7, wherein the metal layer comprises titanium, zirconium, hafnium, vanadium, niobium, tantalum, chromium, molybdenum or tungsten.

13. The solid electrolytic capacitor as claimed in claim 7, wherein the metal carbide layer comprises titanium carbide, zirconium carbide, hafnium carbide, vanadium carbide, niobium carbide, tantalum carbide, chromium carbide, molybdenum carbide or tungsten carbide.

14. The solid electrolytic capacitor as claimed in claim 7, wherein the metal layer and the metal carbide layer respectively have thicknesses of 10-100 nm.

15. The solid electrolytic capacitor as claimed in claim 7, wherein the carbon layer has a thickness of 100-1,000 nm.

16. The solid electrolytic capacitor as claimed in claim 7, wherein the composite cathode foil has resistivity of $10^{-3}$-$10^3$ Ωcm.

17. The solid electrolytic capacitor as claimed in claim 7, wherein the solid electrolytic capacitor is a wound type solid electrolytic capacitor.

* * * * *